United States Patent
Hotelling et al.

(10) Patent No.: US 8,633,915 B2
(45) Date of Patent: Jan. 21, 2014

(54) SINGLE-LAYER TOUCH-SENSITIVE DISPLAY

(75) Inventors: Steve Porter Hotelling, San Jose, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1111 days.

(21) Appl. No.: 12/038,760

(22) Filed: Feb. 27, 2008

(65) Prior Publication Data

US 2009/0091551 A1 Apr. 9, 2009

Related U.S. Application Data

(60) Provisional application No. 60/977,621, filed on Oct. 4, 2007.

(51) Int. Cl.
G06F 3/045 (2006.01)
(52) U.S. Cl.
USPC ..... 345/174; 345/173; 178/18.01; 178/18.02; 178/18.03; 178/18.04
(58) Field of Classification Search
USPC ................................. 345/170–174
See application file for complete search history.

(56) References Cited

U.S. PATENT DOCUMENTS

| | | | |
|---|---|---|---|
| 4,304,976 A | 12/1981 | Gottbreht et al. | |
| 4,659,874 A | 4/1987 | Landmeier | |
| 5,194,862 A | 3/1993 | Edwards | |
| 5,317,919 A | 6/1994 | Awtrey | |
| 5,459,463 A | 10/1995 | Gruaz et al. | |
| 5,488,204 A | 1/1996 | Mead et al. | |
| 5,880,411 A | 3/1999 | Gillespie et al. | |
| 6,188,391 B1 * | 2/2001 | Seely et al. | 345/173 |
| 6,323,846 B1 | 11/2001 | Westerman et al. | |
| 7,129,935 B2 | 10/2006 | Mackey | |
| 7,138,686 B1 | 11/2006 | Banerjee et al. | |

(Continued)

FOREIGN PATENT DOCUMENTS

CN 1672119 A 9/2005
CN 1711520 A 12/2005

(Continued)

OTHER PUBLICATIONS

International Search Report mailed on Mar. 19, 2009, for PCT Application No. PCT/US2008/078836, filed on Oct. 3, 2008, four pages.

(Continued)

*Primary Examiner* — Grant Sitta
(74) *Attorney, Agent, or Firm* — Morrison & Foerster LLP

(57) ABSTRACT

A touch sensor panel having co-planar single-layer touch sensors fabricated on a single side of a substrate is disclosed. The drive and sense lines can be fabricated as column-like patterns in a first orientation and patches in a second orientation, where each column-like pattern in the first orientation is connected to a separate metal trace in the border area of the touch sensor panel, and all patches in each of multiple rows in the second orientation are connected together using a separate metal trace in the border area of the touch sensor panel. The metal traces in the border areas can be formed on the same side of the substrate as the patches and columns, but separated from the patches and column-like patterns by a dielectric layer.

34 Claims, 8 Drawing Sheets

(56) References Cited

U.S. PATENT DOCUMENTS

| | | | |
|---|---|---|---|
| 7,538,760 B2 | 5/2009 | Hotelling et al. | |
| 8,120,371 B2 | 2/2012 | Day et al. | |
| 8,223,133 B2 | 7/2012 | Hristov | |
| 8,319,747 B2 | 11/2012 | Hotelling et al. | |
| 8,479,122 B2 | 7/2013 | Hotelling et al. | |
| 8,487,898 B2 | 7/2013 | Hotelling | |
| 2004/0017362 A1 | 1/2004 | Mulligan et al. | |
| 2004/0090429 A1 | 5/2004 | Geaghan et al. | |
| 2004/0239650 A1 | 12/2004 | Mackey | |
| 2005/0073507 A1 | 4/2005 | Richter et al. | |
| 2005/0083307 A1 | 4/2005 | Aufderheide et al. | |
| 2005/0146509 A1 | 7/2005 | Geaghan et al. | |
| 2005/0270039 A1 | 12/2005 | Mackey | |
| 2005/0280639 A1 | 12/2005 | Taylor et al. | |
| 2006/0026521 A1 | 2/2006 | Hotelling et al. | |
| 2006/0038791 A1 | 2/2006 | Mackey | |
| 2006/0097991 A1* | 5/2006 | Hotelling et al. | 345/173 |
| 2006/0132463 A1 | 6/2006 | Lee et al. | |
| 2006/0146484 A1 | 7/2006 | Kim et al. | |
| 2006/0197753 A1 | 9/2006 | Hotelling | |
| 2007/0008299 A1* | 1/2007 | Hristov | 345/173 |
| 2007/0074914 A1 | 4/2007 | Geaghan et al. | |
| 2007/0229468 A1 | 10/2007 | Peng et al. | |
| 2007/0247443 A1 | 10/2007 | Philipp | |
| 2007/0279395 A1 | 12/2007 | Philipp et al. | |
| 2008/0062139 A1 | 3/2008 | Hotelling et al. | |
| 2008/0074398 A1* | 3/2008 | Wright | 345/173 |
| 2008/0136787 A1 | 6/2008 | Yeh et al. | |
| 2008/0158167 A1 | 7/2008 | Hotelling et al. | |
| 2008/0158181 A1 | 7/2008 | Hamblin et al. | |
| 2008/0264699 A1 | 10/2008 | Chang et al. | |
| 2008/0277259 A1 | 11/2008 | Chang | |
| 2008/0309633 A1 | 12/2008 | Hotelling et al. | |
| 2008/0309635 A1 | 12/2008 | Matsuo | |
| 2009/0002337 A1 | 1/2009 | Chang | |
| 2009/0019344 A1 | 1/2009 | Yoon et al. | |
| 2009/0054107 A1 | 2/2009 | Feland et al. | |
| 2009/0182189 A1 | 7/2009 | Lira | |
| 2009/0236151 A1 | 9/2009 | Yeh et al. | |
| 2009/0242283 A1 | 10/2009 | Chiu | |
| 2009/0267902 A1 | 10/2009 | Nambu et al. | |
| 2009/0303189 A1 | 12/2009 | Grunthaner et al. | |
| 2009/0309850 A1 | 12/2009 | Yang | |
| 2009/0315854 A1 | 12/2009 | Matsuo | |
| 2010/0328228 A1 | 12/2010 | Elias | |
| 2010/0328248 A1 | 12/2010 | Mozdzyn | |
| 2011/0007020 A1 | 1/2011 | Hong | |
| 2013/0120303 A1 | 5/2013 | Hong et al. | |

FOREIGN PATENT DOCUMENTS

| | | | |
|---|---|---|---|
| CN | 1782837 A | 6/2006 | |
| CN | 1818842 A | 8/2006 | |
| CN | 1864124 A | 11/2006 | |
| CN | 1945516 A | 4/2007 | |
| CN | 101046720 A | 10/2007 | |
| CN | 101071354 A | 11/2007 | |
| DE | 11 2008 001 245 T5 | 3/2010 | |
| EP | 0 853 230 A1 | 7/1998 | |
| EP | 1 192 585 A1 | 4/2002 | |
| EP | 1 192 585 B1 | 4/2002 | |
| EP | 1 573 706 A2 | 9/2005 | |
| EP | 1 573 706 A3 | 9/2005 | |
| EP | 1 644 918 A2 | 4/2006 | |
| EP | 2 077 489 A1 | 7/2009 | |
| GB | 1 546 317 | 5/1979 | |
| GB | 2 144 146 A | 2/1985 | |
| GB | 2 428 306 A | 1/2007 | |
| GB | 2 437 827 A | 11/2007 | |
| JP | 2004-503835 A | 2/2004 | |
| JP | 2005-084128 A | 3/2005 | |
| JP | 2007-018515 A | 1/2007 | |
| JP | 2008-510251 A | 4/2008 | |
| TW | M344522 | 11/2008 | |
| TW | M344544 | 11/2008 | |
| WO | WO-01/97204 A1 | 12/2001 | |
| WO | WO-2006/023147 A2 | 3/2006 | |
| WO | WO-2006/104745 A2 | 10/2006 | |
| WO | WO-2006/104745 A3 | 10/2006 | |
| WO | WO-2006/130584 A2 | 12/2006 | |
| WO | WO-2007/034591 A1 | 3/2007 | |
| WO | WO-2007/054018 A1 | 5/2007 | |
| WO | WO-2007/146785 A2 | 12/2007 | |
| WO | WO-2008/007118 A2 | 1/2008 | |
| WO | WO-2008/108514 A1 | 9/2008 | |
| WO | WO-2008/135713 A1 | 11/2008 | |
| WO | WO-2009/046363 A1 | 4/2009 | |
| WO | WO-2009/132146 A1 | 10/2009 | |
| WO | WO-2009/132150 A1 | 10/2009 | |
| WO | WO-2010/117882 A2 | 10/2010 | |

OTHER PUBLICATIONS

European Search Report mailed Mar. 19, 2009, for EP Application No. 08017396.6, filed Oct. 8, 2008, seven pages.

Great Britain Search Report mailed Jan. 19, 2009, for GB Application No. GB0817242.1, filed Sep. 22, 2008, two pages.

Cassidy, R. (Feb. 23, 2007). "The Tissot T-Touch Watch—A Groundbreaking Timepiece," located at <http://ezinearticles.com/?The-Tissot-T-Touch-Watch—A-Groundbreaking-Timepiece&id...>, last visited Jan. 23, 2009, two pages.

International Search Report mailed Jul. 17, 2009, for PCT Application No. PCT/US2009/041460, three pages.

Chinese Search Report mailed Jan. 10, 2011, for CN Application No. 2008201338142, filed Sep. 27, 2008, with English Translation, 25 pages.

International Search Report mailed Jan. 14, 2011, for PCT Application No. PCT/US2010/029698, filed Apr. 1, 2010, 5 pages.

Final Office Action mailed Aug. 31, 2012, for U.S. Appl. No. 12/110,075, filed Apr. 25, 2008, 15 pages.

Final Office Action mailed Dec. 15, 2011, for U.S. Appl. No. 12/333,250, filed Dec. 11, 2008, 12 pages.

Non-Final Office Action mailed Jan. 25, 2012, for U.S. Appl. No. 12/110,075, filed Apr. 25, 2008, 21 pages.

Chinese Search Report completed Jun. 3, 2011, for CN Patent Application No. ZL2009201524013, with English Translation, 20 pages.

Final Office Action mailed Jan. 19, 2012, for U.S. Appl. No. 12/110,024, filed Apr. 25, 2008, 12 pages.

Final Office Action mailed Dec. 24, 2012, for U.S. Appl. No. 12/110,024, filed Apr. 25, 2008, 21 pages.

Final Office Action mailed Feb. 5, 2013, for U.S. Appl. No. 12/500,911, filed Jul. 10, 2009, 15 pages.

International Search Report mailed Aug. 5, 2009, for PCT Application No. PCT/US2009/041465, filed Apr. 22, 2009, four pages.

Non-Final Office Action mailed Jul. 11, 2011, for U.S. Appl. No. 12/110,024, filed Apr. 25, 2008, 12 pages.

Non-Final Office Action mailed Jul. 3, 2012, for U.S. Appl. No. 12/110,024, filed Apr. 25, 2008, 19 pages.

Non-Final Office Action mailed Mar. 29, 2013 for U.S. Appl. No. 13/737,779, filed Jan. 9, 2013.

Chinese Search Report mailed Jan. 7, 2011, for CN Application No. 2009200081997, filed Apr. 24, 2009, with English Translation, 14 pages.

Non-Final Office Action mailed Jun. 7, 2012, for U.S. Appl. No. 12/500,911, filed Jul. 10, 2009, 16 pages.

Non-Final Office Action mailed Jul. 8, 2011, for U.S. Appl. No. 12/110,075, filed Apr. 25, 2008, 14 pages.

Non-Final Office Action mailed Aug. 17, 2011, for U.S. Appl. No. 12/333,250, filed Dec. 11, 2008, 12 pages.

Notice of Allowance mailed Aug. 28, 2012, for U.S. Appl. No. 12/333,250, filed Dec. 11, 2008, nine pages.

Non-Final Office Action mailed Mar. 28, 2013, for U.S. Appl. No. 12/110,075, filed Apr. 25, 2008, 14 pages.

(56) References Cited

OTHER PUBLICATIONS

Notice of Allowance mailed May 23, 2013, for U.S. Appl. No. 12/110,024, filed Apr. 25, 2008, five pages.
Notice of Allowance mailed Aug. 19, 2013, for U.S. Appl. No. 12/110,075, filed Apr. 25, 2008, eight pages.
Notice of Allowance mailed Aug. 19, 2013, for U.S. Appl. No. 12/500,911, filed Jul. 10, 2009, six pages.
Notice of Allowance mailed Sep. 3, 2013, for U.S. Appl. No. 13/737,779, filed Jan. 9, 2013, 10 pages.

* cited by examiner

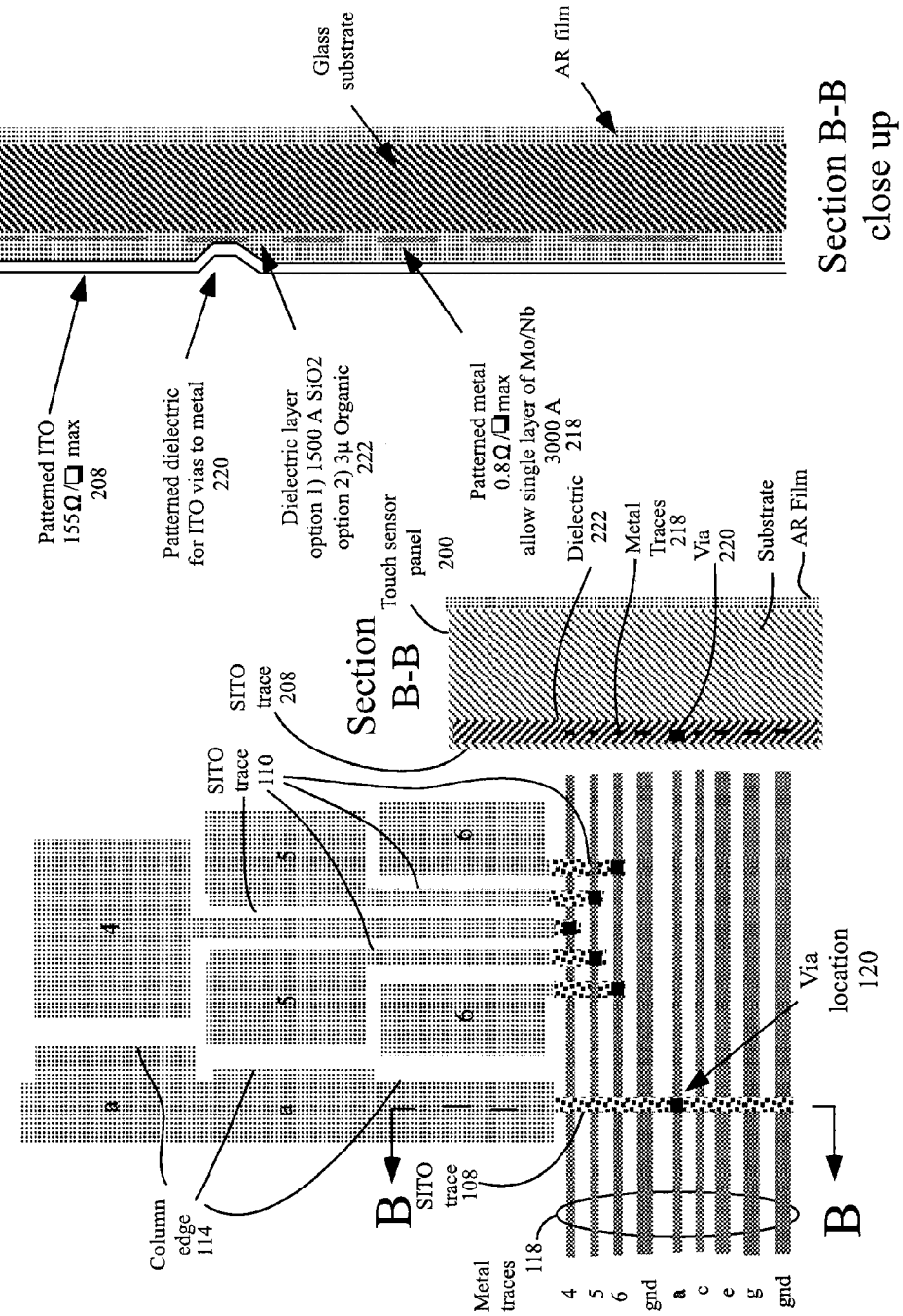

SINGLE-LAYER TOUCH-SENSITIVE DISPLAY

CROSS-REFERENCE TO RELATED APPLICATIONS

The present invention claims the benefit, under 35 U.S.C §119(e), of U.S. Provisional Patent Application No. 60/977,621 filed Oct. 4, 2007, entitled "Single-Layer Touch-Sensitive Display," the contents of which are incorporated by reference herein.

FIELD OF THE INVENTION

This relates generally to input devices for computing systems, and more particularly, to a mutual-capacitance multi-touch sensor panel capable of being fabricated on a single side of a substrate.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch sensor panels can be implemented as an array of pixels formed by multiple drive lines (e.g. rows) crossing over multiple sense lines (e.g. columns), where the drive and sense lines are separated by a dielectric material. An example of such a touch sensor panel is described in Applicant's co-pending U.S. application Ser. No. 11/650,049 entitled "Double-Sided Touch Sensitive Panel and Flex Circuit Bonding," filed on Jan. 3, 2007, the contents of which are incorporated by reference herein. However, touch sensor panels having drive and sense lines formed on the bottom and top sides of a single substrate can be expensive to manufacture. One reason for this additional expense is that thin-film processing steps must be performed on both sides of the glass substrate, which requires protective measures for the processed side while the other side is being processed. Another reason is the cost of the flex circuit fabrication and bonding needed to connect to both sides of the substrate.

SUMMARY OF THE INVENTION

This relates to a substantially transparent touch sensor panel having co-planar single-layer touch sensors fabricated on a single side of a substrate for detecting single or multi-touch events (the touching of one or multiple fingers or other objects upon a touch-sensitive surface at distinct locations at about the same time). To avoid having to fabricate substantially transparent drive and sense lines on opposite sides of the same substrate, embodiments of the invention can form the drive and sense lines on a co-planar single layer on the same side of the substrate. The drive and sense lines can be fabricated as column-like patterns in a first orientation and patches in a second orientation, where each column-like pattern in the first orientation is connected to a separate metal trace in the border area of the touch sensor panel, and all patches in each of multiple rows in the second orientation are connected together using a separate metal trace (or other conductive material) in the border area of the touch sensor panel. The metal traces in the border areas can be formed on the same side of the substrate as the patches and columns, but separated from the patches and column-like patterns by a dielectric layer. The metal traces can allow both the patches and column-like patterns to be routed to the same short edge of the substrate so that a small flex circuit can be bonded to a small area on only one side of the substrate.

BRIEF DESCRIPTION OF THE DRAWINGS

FIG. 1c illustrates an exemplary connection of columns and row patches to the metal traces in the border area of the touch sensor panel according to one embodiment of this invention.

FIG. 2a illustrates an exemplary cross-section of touch sensor panel showing SITO traces and metal traces connected though a via in a dielectric material according to one embodiment of this invention.

FIG. 2b is a close-up view of the exemplary cross-section shown in FIG. 2a according to one embodiment of this invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to a substantially transparent touch sensor panel having co-planar single-layer touch sensors fabricated on a single side of a substrate for detecting single or multi-touch events (the touching of one or multiple fingers or other objects upon a touch-sensitive surface at distinct locations at about the same time). To avoid having to fabricate substantially transparent drive and sense lines on opposite sides of the same substrate, embodiments of the invention can form the drive and sense lines on a co-planar single layer on the same side of the substrate. The drive and sense lines can be fabricated as column-like patterns in a first orientation and patches in a second orientation, where each column-like pattern in the first orientation is connected to a separate metal trace in the border area of the touch sensor panel, and all patches in each of multiple rows in the second orientation are connected together using a separate metal trace (or other conductive material) in the border area of the touch sensor panel. The metal traces in the border areas can be formed on the same side of the substrate as the patches and columns, but separated from the patches and column-like patterns by a dielectric layer. The metal traces can allow both the patches and column-like patterns to be routed to the same short edge of the substrate so that a small flex circuit can be bonded to a small area on only one side of the substrate.

Although some embodiments of this invention may be described herein in terms of mutual capacitance multi-touch sensor panels, it should be understood that embodiments of this invention are not so limited, but are additionally applicable to self-capacitance sensor panels and single-touch sensor panels. Furthermore, although the touch sensors in the sensor panel may be described herein in terms of an orthogonal array of touch sensors having rows and columns, embodiments of this invention are not limited to orthogonal arrays, but can be generally applicable to touch sensors arranged in any number of dimensions and orientations, including diagonal, concentric circle, three-dimensional and random orientations.

Figure 1A:
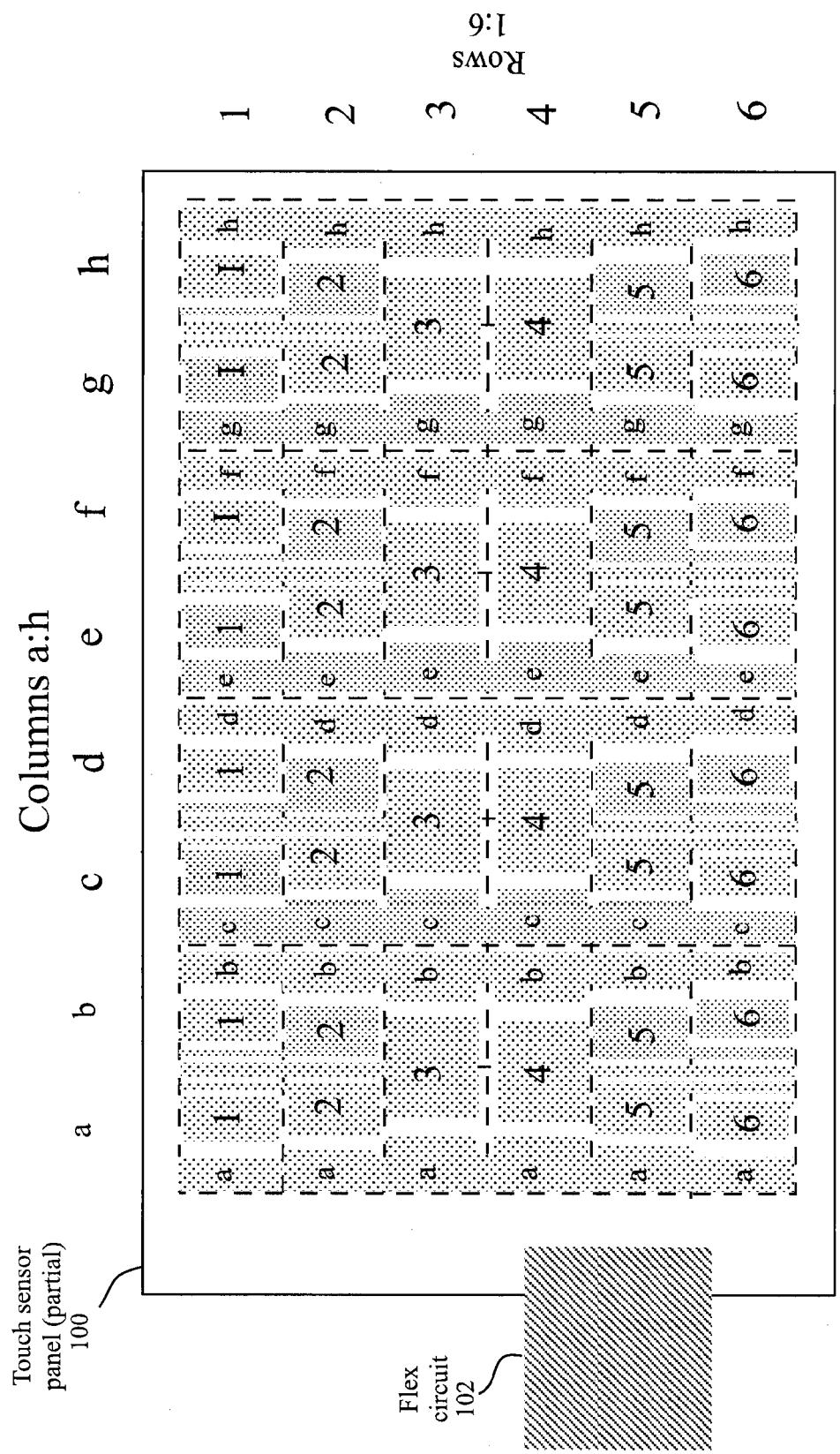
FIG. 1a illustrates a partial view of an exemplary substantially transparent touch sensor panel having co-planar single-layer touch sensors fabricated on a single side of a substrate according to one embodiment of this invention.

FIG. 1a illustrates a partial view of exemplary substantially transparent touch sensor panel 100 having co-planar single-layer touch sensors fabricated on a single side of a substrate according to embodiments of the invention. In the example of FIG. 1a, touch sensor panel 100 having eight columns (labeled a through h) and six rows (labeled 1 through 6) is shown, although it should be understood that any number of columns and rows can be employed. Columns a through h can generally be columnar in shape, although in the example of FIG. 1a, one side of each column includes staggered edges and notches designed to create separate sections in each column. Each of rows 1 through 6 can be formed from a plurality of distinct patches or pads, each patch including a trace of the same material as the patch and routed to the border area of touch sensor panel 100 for enabling all patches in a particular row to be connected together through metal traces (not shown in FIG. 1a) running in the border areas. These metal traces can be routed to a small area on one side of touch sensor panel 100 and connected to a flex circuit 102. As shown in the example of FIG. 1a, the patches forming the rows can be arranged in a generally pyramid-shaped configuration. In FIG. 1a, for example, the patches for rows 1-3 between columns a and b are arranged in an inverted pyramid configuration, while the patches for rows 4-6 between columns a and b are arranged in an upright pyramid configuration.

The columns and patches of FIG. 1a can be formed in a co-planar single layer of conductive material. In touch screen embodiments, the conductive material can be a substantially transparent material such as Single-layer Indium Tin Oxide (SITO), although other materials can also be used. The SITO layer can be formed either on the back of a coverglass or on the top of a separate substrate. Although SITO may be referred to herein for purposes of simplifying the disclosure, it should be understood that other conductive materials can also be used according to embodiments of the invention.

Figure 1B:
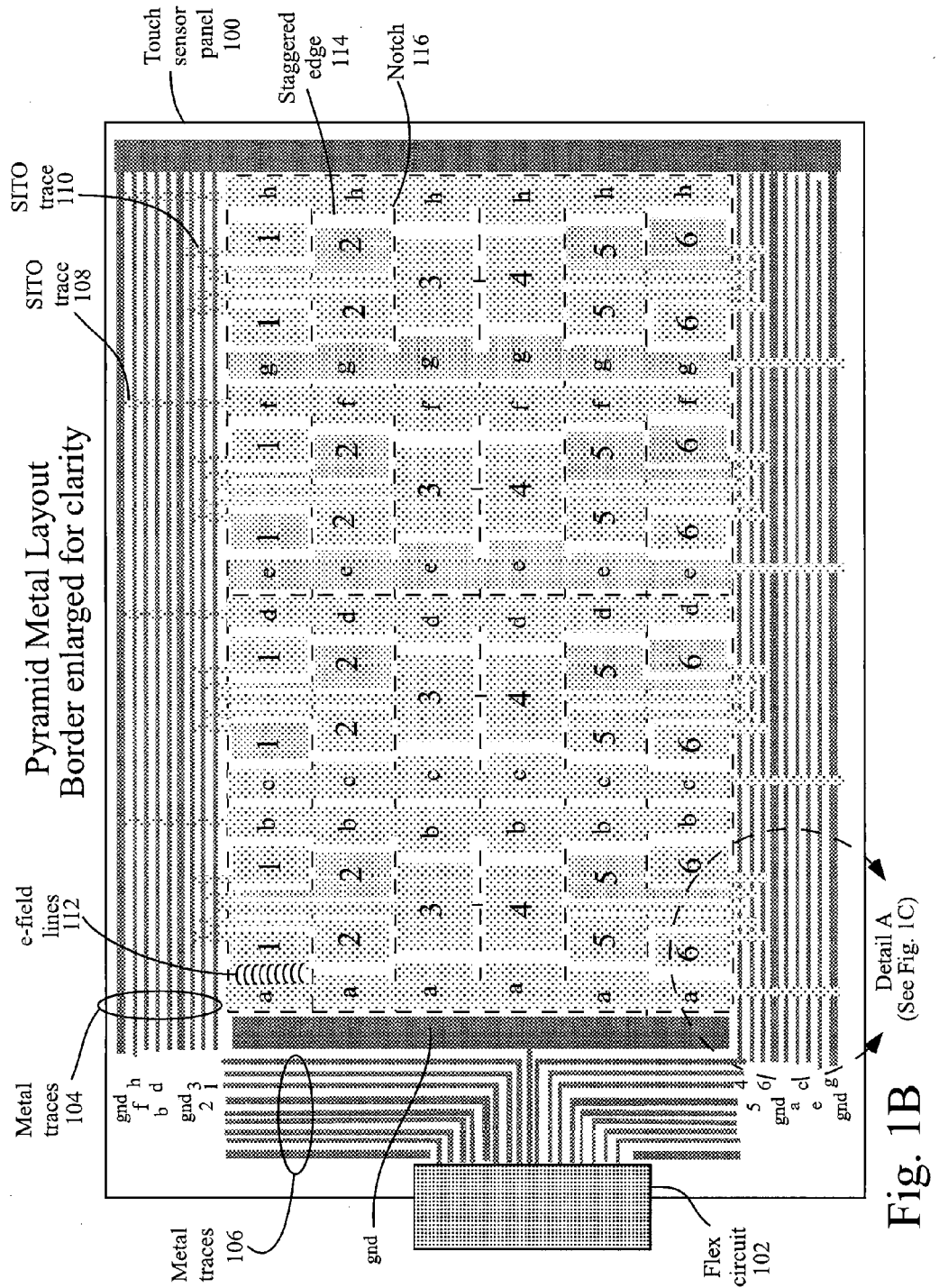
FIG. 1b illustrates a partial view of an exemplary substantially transparent touch sensor panel including metal traces running in the border areas of the touch sensor panel according to one embodiment of this invention.

FIG. 1b illustrates a partial view of exemplary substantially transparent touch sensor panel 100 including metal traces 104 and 106 running in the border areas of the touch sensor panel according to embodiments of the invention. Note that the border areas in FIG. 1b are enlarged for clarity. Each column a-h can include SITO trace 108 that allows the column to be connected to a metal trace through a via (not shown in FIG. 1b). One side of each column includes staggered edges 114 and notches 116 designed to create separate sections in each column. Each row patch 1-6 can include SITO trace 110 that allows the patch to be connected to a metal trace through a via (not shown in FIG. 1b). SITO traces 110 can allow each patch in a particular row to be self-connected to each other. Because all metal traces 104 and 106 are formed on the same layer, they can all be routed to the same flex circuit 102.

If touch sensor panel 100 is operated as a mutual capacitance touch sensor panel, either the columns a-h or the rows 1-6 can be driven with one or more stimulation signals, and fringing electric field lines can form between adjacent column areas and row patches. In FIG. 1b, it should be understood that although only electric field lines 112 between column a and row patch 1 (a-1) are shown for purposes of illustration, electric field lines can be formed between other adjacent column and row patches (e.g. a-2, b-4, g-5, etc.) depending on what columns or rows are being stimulated. Thus, it should be understood that each column-row patch pair (e.g. a-1, a-2, b-4, g-5, etc.) can represent a two-electrode pixel or sensor at which charge can be coupled onto the sense electrode from the drive electrode. When a finger touches down over one of these pixels, some of the fringing electric field lines that extend beyond the cover of the touch sensor panel are blocked by the finger, reducing the amount of charge coupled onto the sense electrode. This reduction in the amount of coupled charge can be detected as part of determining a resultant "image" of touch. It should be noted that in mutual capacitance touch sensor panel designs as shown in FIG. 1b, no separate reference ground is needed, so no second layer on the back side of the substrate, or on a separate substrate, is needed.

Touch sensor panel 100 can also be operated as a self-capacitance touch sensor panel. In such an embodiment, a reference ground plane can be formed on the back side of the substrate, on the same side as the patches and columns but separated from the patches and columns by a dielectric, or on a separate substrate. In a self-capacitance touch sensor panel, each pixel or sensor has a self-capacitance to the reference ground that can be changed due to the presence of a finger. In self-capacitance embodiments, the self-capacitance of columns a-h can be sensed independently, and the self-capacitance of rows 1-6 can also be sensed independently.

FIG. 1c illustrates an exemplary connection of columns and row patches to the metal traces in the border area of the touch sensor panel according to embodiments of the invention. FIG. 1c represents "Detail A" as shown in FIG. 1b, and shows column "a" and row patches 4-6 connected to metal traces 118 through SITO traces 108 and 110. Because SITO traces 108 and 110 are separated from metal traces 118 by a dielectric material, vias 120 formed in the dielectric material allow the SITO traces to connect to the metal traces.

FIG. 2a illustrates an exemplary cross-section of touch sensor panel 200 showing SITO trace 208 and metal traces 218 connected though via 220 in dielectric material 222 according to embodiments of the invention. FIG. 2a represents view B-B as shown in FIG. 1c.

FIG. 2b is a close-up view of the exemplary cross-section shown in FIG. 2a according to embodiments of the invention. FIG. 2b shows one exemplary embodiment wherein SITO trace 208 has a resistivity of about 155 ohms per square max. In one embodiment, dielectric 222 can be about 1500 angstroms of inorganic $SiO_2$, which can be processed at a higher temperature and therefore allows the SITO layer to be sputtered with higher quality. In another embodiment, dielectric 222 can be about 3.0 microns of organic polymer. The 1500 angstroms of inorganic $SiO_2$ can be used for touch sensor panels small enough such that the crossover capacitance (between SITO trace 208 and metal traces 218) is not an issue.

For larger touch sensor panels (having a diagonal dimension of about 3.5" or greater), crossover capacitance can be an issue, creating an error signal that can only partially be compensated. Thus, for larger touch sensor panels, a thicker dielectric layer 222 with a lower dielectric constant such as about 3.0 microns of organic polymer can be used to lower the crossover capacitance. However, use of a thicker dielectric layer can force the SITO layer to be sputtered at a lower temperature, resulting in lower optical quality and higher resistivity.

Referring again to the example of FIG. 1c, column edges 114 and row patches 4-6 can be staggered in the x-dimension because space must be made for SITO traces 110 connecting row patches 4 and 5. (It should be understood that row patch 4 in the example of FIG. 1c is really two patches stuck together.) To gain optimal touch sensitivity, it can be desirable to balance the area of the electrodes in pixels a-6, a-5 and a-4. However, if column "a" was kept linear, row patch 6 can be slimmer than row patch 5 or 6, and an imbalance would be created between the electrodes of pixel a-6.

Figure 3:
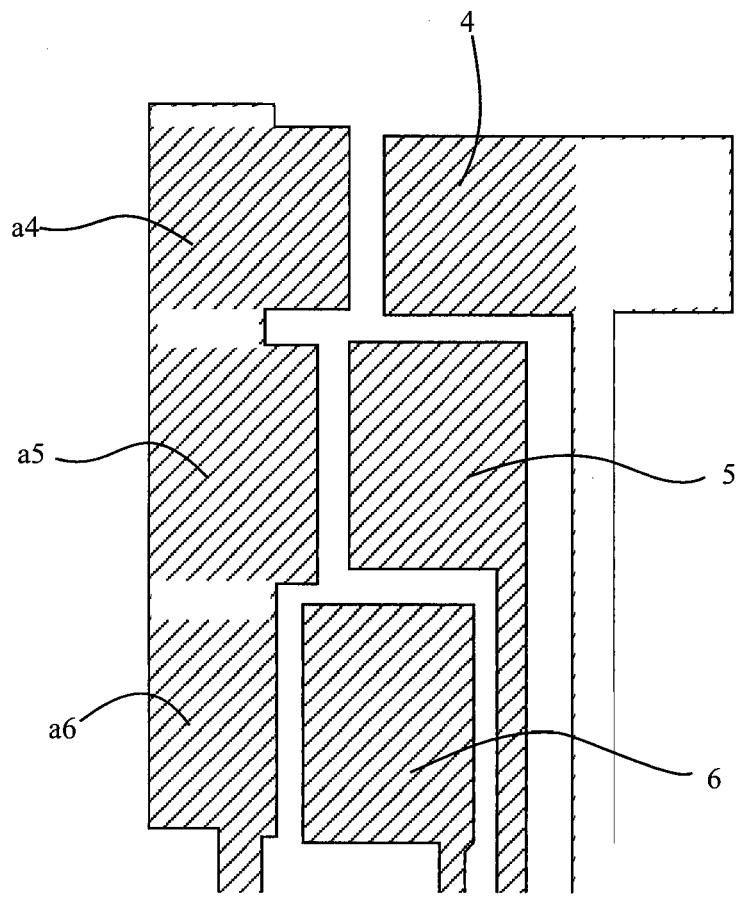
FIG. 3 illustrates a top view of an exemplary column and adjacent row patches according to one embodiment of this invention.

FIG. 3 illustrates a top view of an exemplary column and adjacent row patches according to embodiments of the invention. It can be generally desirable to make the mutual capacitance characteristics of pixels a-4, a-5 and a-6 relatively constant to produce a relatively uniform z-direction touch sensitivity that stays within the range of touch sensing circuitry. Accordingly, the column areas $a_4$, $a_5$ and $a_6$ should be about the same as row patch areas 4, 5 and 6. To accomplish this, column section $a_4$ and $a_5$, and row patch 4 and 5 can be shrunk in the y-direction as compared to column section a6 and row patch 6 so that the area of column segment $a_4$ matches the area of column segments $a_5$ and $a_6$. In other words, pixel $a_4$-4 will be wider but shorter than pixel $a_6$-6, which will be narrower but taller.

It should be evident from the previously mentioned figures that raw spatial sensitivity can be somewhat distorted. In other words, because the pixels or sensors can be slightly skewed or misaligned in the x-direction, the x-coordinate of a maximized touch event on pixel a-6 (e.g. a finger placed down directly over pixel a-6) can be slightly different from the x-coordinate of a maximized touch event on pixel a-4, for example. Accordingly, in embodiments of the invention this misalignment can be de-warped in a software algorithm to re-map the pixels and remove the distortion.

Although a typical touch panel grid dimension can have pixels arranged on 5.0 mm centers, a more spread-out grid having about 6.0 mm centers, for example, can be desirable to reduce the overall number of electrical connections in the touch sensor panel. However, spreading out the sensor pattern can cause erroneous touch readings.

Figure 4A:
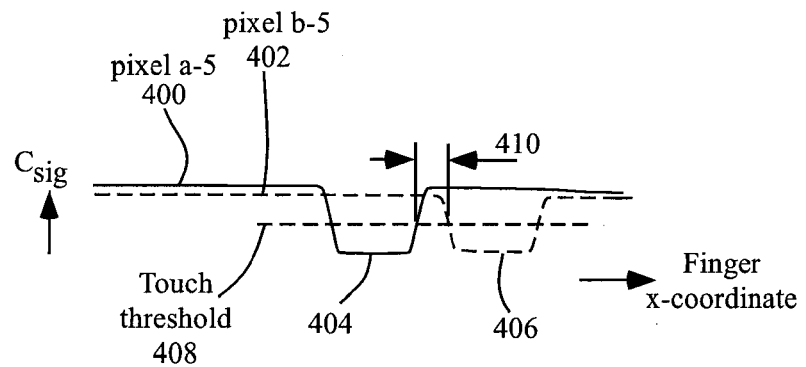
FIG. 4a is a plot of an x-coordinate of a finger touch versus mutual capacitance seen at a pixel for a two adjacent pixels a-5 and b-5 in a single row having wide spacings.

FIG. 4a is a plot of an x-coordinate of a finger touch versus mutual capacitance seen at a pixel for a two adjacent pixels a-5 and b-5 in a single row having wide spacings. In FIG. 4a, plot 400 represents the mutual capacitance seen at pixel a-5 as the finger touch moves continuously from left to right, and plot 402 represents the mutual capacitance seen at pixel b-5 as the finger touch moves continuously from left to right. As expected, a drop in the mutual capacitance 404 is seen at pixel a-5 when the finger touch passes directly over pixel a-5, and a similar drop in the mutual capacitance 406 is seen at pixel b-5 when the finger touch passes directly over pixel b-5. If line 408 represents a threshold for detecting a touch event, FIG. 4a illustrates that even though the finger is never lifted from the surface of the touch sensor panel, it can erroneously appear at 410 that the finger has momentarily lifted off the surface. This location 410 can represent a point about halfway between the two spread-out pixels.

Figure 4B:
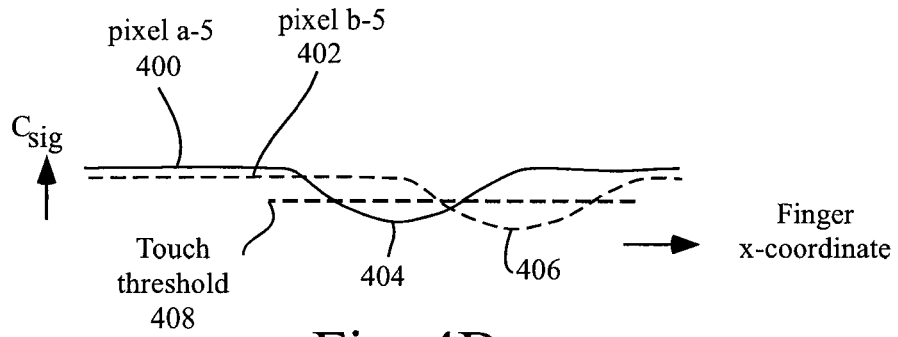
FIG. 4b is a plot of an x-coordinate of a finger touch versus mutual capacitance seen at a pixel for a two adjacent pixels a-5 and b-5 in a single row having wide spacings where spatial interpolation has been provided according to one embodiment of this invention.

FIG. 4b is a plot of an x-coordinate of a finger touch versus mutual capacitance seen at a pixel for a two adjacent pixels a-5 and b-5 in a single row having wide spacings where spatial interpolation has been provided according to embodiments of the invention. As expected, a drop in the mutual capacitance 404 is seen at pixel a-5 when the finger touch passes directly over pixel a-5, and a similar drop in the mutual capacitance 406 is seen at pixel b-5 when the finger touch passes directly over pixel b-5. Note, however, that the rise and fall in the mutual capacitance value occurs more gradually than in FIG. 4a. If line 408 represents a threshold for detecting a touch event, FIG. 4b illustrates that as the finger moves from left to right over pixel a-5 and b-5, a touch event is always detected at either pixel a-5 or b-5. In other words, this "blurring" of touch events is helpful to prevent the appearance of false no-touch readings.

In one embodiment of the invention, the thickness of the coverglass for the touch sensor panel can be increased to create part or all of the spatial blurring or filtering shown in FIG. 4b.

Figure 4C:
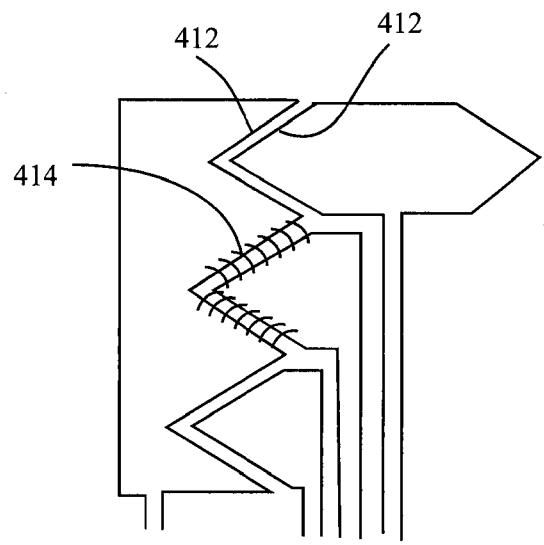
FIG. 4c illustrates a top view of an exemplary column and adjacent row patch pattern useful for larger pixel spacings according to one embodiment of this invention.

FIG. 4c illustrates a top view of an exemplary column and adjacent row patch pattern useful for larger pixel spacings according to embodiments of the invention. FIG. 4c illustrates an exemplary embodiment in which sawtooth electrode edges 412 are employed within a pixel elongated in the x-direction. The sawtooth electrode edges can allow fringing electric field lines 414 to be present over a larger area in the x-direction so that a touch event can be detected by the same pixel over a larger distance in the x-direction. It should be understood that the sawtooth configuration of FIG. 4c is only exemplary, and that other configurations such serpentine edges and the like can also be used. These configurations can further soften the touch patterns and create additional spatial filtering and interpolation between adjacent pixels as shown in FIG. 4b.

Figure 5:
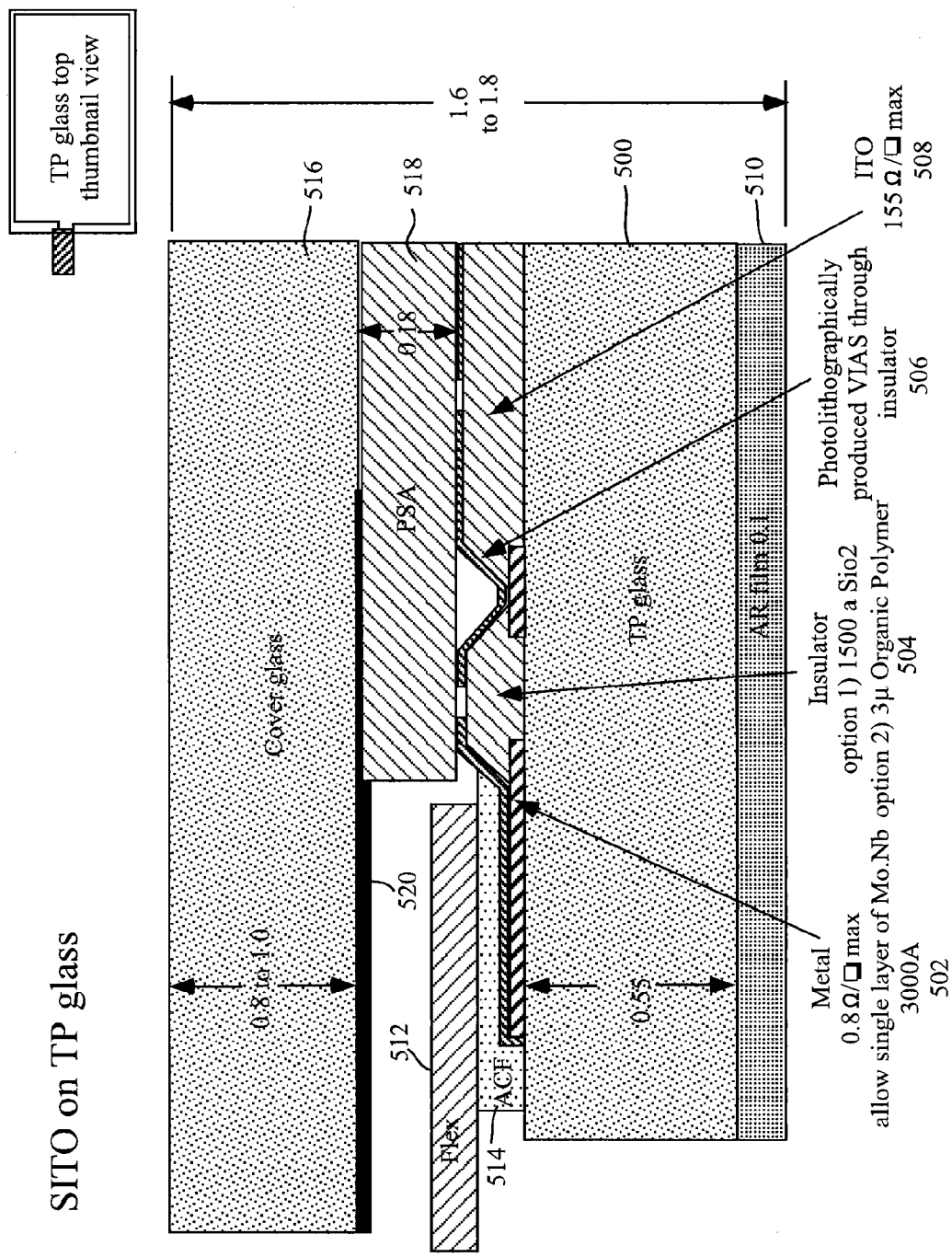
FIG. 5 illustrates an exemplary stackup of SITO on a touch sensor panel substrate bonded to a cover glass according to one embodiment of this invention.

FIG. 5 illustrates an exemplary stackup of SITO on a touch sensor panel substrate bonded to a cover glass according to embodiments of the invention. The stackup can include touch sensor panel substrate 500, which can be formed from glass, upon which anti-reflective (AR) film 510 can be formed on one side and metal 502 can be deposited and patterned on the other side to form the bus lines in the border areas. Metal 502 can have a resistivity of 0.8 ohms per square maximum. Insulating layer 504 can then be deposited over substrate 500 and metal 502. Insulating layer can be, for example, $SiO_2$ with a thickness of 1500 angstroms, or 3 microns of organic polymer. Photolithography can be used to form vias 506 in insulator 504, and conductive material 508 can then deposited and patterned on top of the insulator and metal 502. The single layer of conductive material 508, which can be formed from transparent conductive material such as ITO having a resistivity of 155 ohms per square maximum, can be more transparent than multi-layer designs, and can be easier to manufacture. Flex circuit 512 can be bonded to conductive material 508 and metal 502 using adhesive 514 such as anisotropic conductive film (ACF). The entire subassembly can then be bonded to cover glass 516 and blackmask 520 using adhesive 518 such as pressure sensitive adhesive (PSA).

In an alternative embodiment, the metal, insulator, conductive material as described above can be formed directly on the back side of the cover glass.

Figure 6:
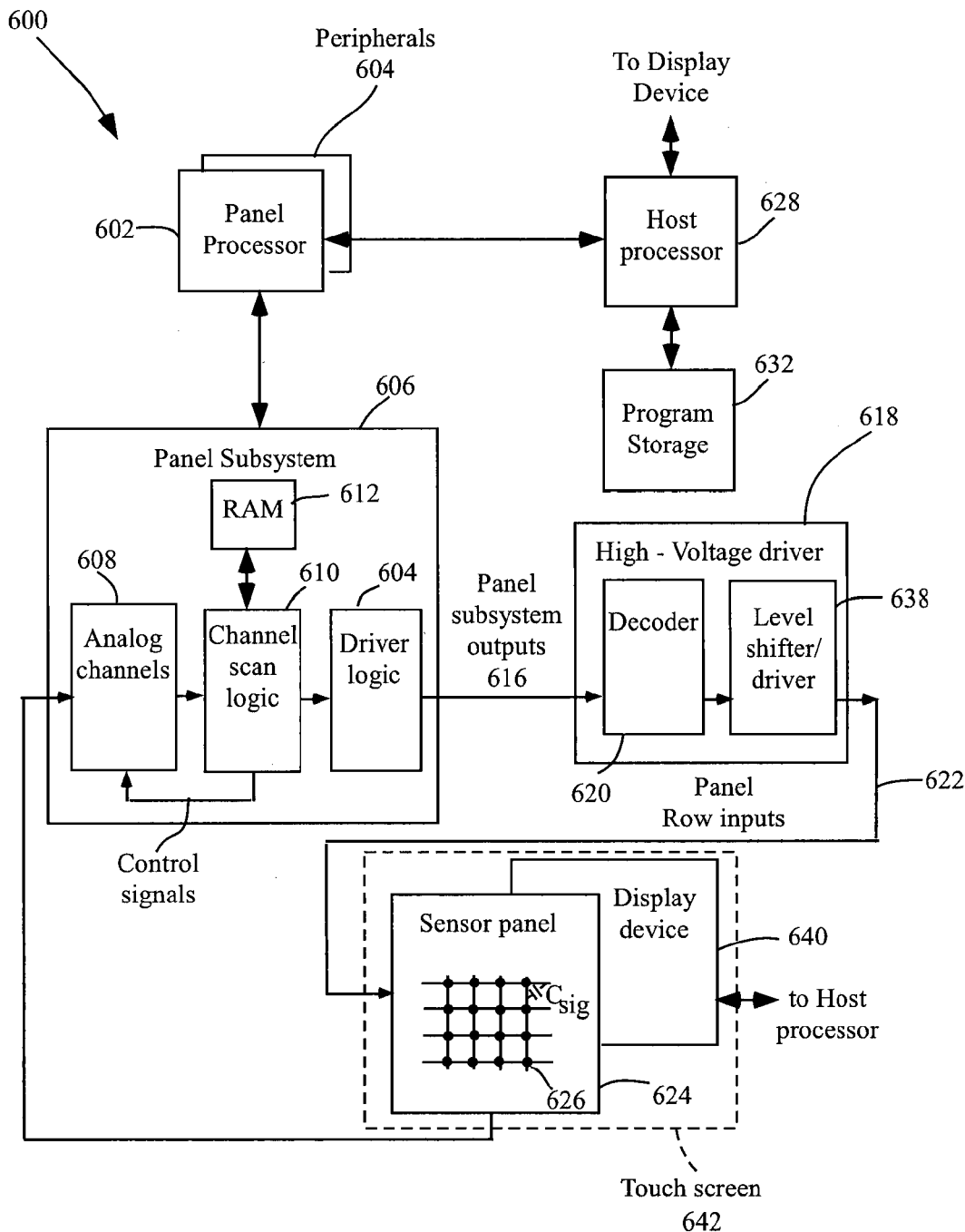
FIG. 6 illustrates an exemplary computing system operable with a touch sensor panel according to one embodiment of this invention.

FIG. 6 illustrates exemplary computing system 600 operable with the touch sensor panel described above according to embodiments of this invention. Touchscreen 642, which can include touch sensor panel 624 and display device 640 (e.g. an LCD module), can be connected to other components in computing system 600 through connectors integrally formed on the sensor panel, or using flex circuits. Computing system 600 can include one or more panel processors 602 and peripherals 604, and panel subsystem 606. The one or more processors 602 can include, for example, ARM968 processors or other processors with similar functionality and capabilities. However, in other embodiments, the panel processor functionality can be implemented instead by dedicated logic such as a state machine. Peripherals 604 can include, but are not limited to, random access memory (RAM) or other types of memory or storage, watchdog timers and the like.

Panel subsystem 606 can include, but is not limited to, one or more analog channels 608, channel scan logic 610 and driver logic 614. Channel scan logic 610 can access RAM 612, autonomously read data from the analog channels and provide control for the analog channels. This control can include multiplexing or otherwise connecting the sense lines of touch sensor panel 624 to analog channels 608. In addition, channel scan logic 610 can control the driver logic and stimulation signals being selectively applied to the drive lines of touch sensor panel 624. In some embodiments, panel subsystem 606, panel processor 602 and peripherals 604 can be integrated into a single application specific integrated circuit (ASIC).

Driver logic 614 can provide multiple panel subsystem outputs 616 and can present a proprietary interface that drives high voltage driver 618. High voltage driver 618 can provide level shifting from a low voltage level (e.g. complementary metal oxide semiconductor (CMOS) levels) to a higher voltage level, providing a better signal-to-noise (S/N) ratio for noise reduction purposes. Panel subsystem outputs 616 can be sent to decoder 620 and level shifter/driver 638, which can selectively connect one or more high voltage driver outputs to one or more panel row or drive line inputs 622 through a proprietary interface and enable the use of fewer high voltage driver circuits in the high voltage driver 618. Each panel row input 622 can drive one or more drive lines in touch sensor panel 624. In some embodiments, high voltage driver 618 and decoder 620 can be integrated into a single ASIC. However, in other embodiments high voltage driver 618 and decoder 620 can be integrated into driver logic 614, and in still other embodiments high voltage driver 618 and decoder 620 can be eliminated entirely.

Computing system 600 can also include host processor 628 for receiving outputs from panel processor 602 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 628 can also perform additional functions that may not be related to panel processing, and can be coupled to program storage 632 and display device 640 such as an LCD for providing a user interface (UI) to a user of the device.

The touch sensor panel described above can be advantageously used in the system of FIG. 6 to provide a space-efficient touch sensor panel and UI that is lower cost, more manufacturable, and fits into existing mechanical control outlines (the same physical envelope).

Figure 7A:
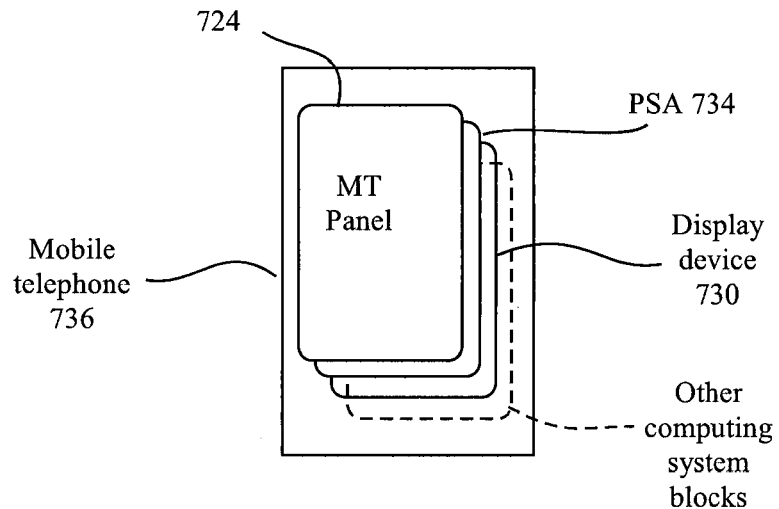
FIG. 7a illustrates an exemplary mobile telephone that can include a touch sensor panel and computing system according to one embodiment of this invention.
Figure 7B:
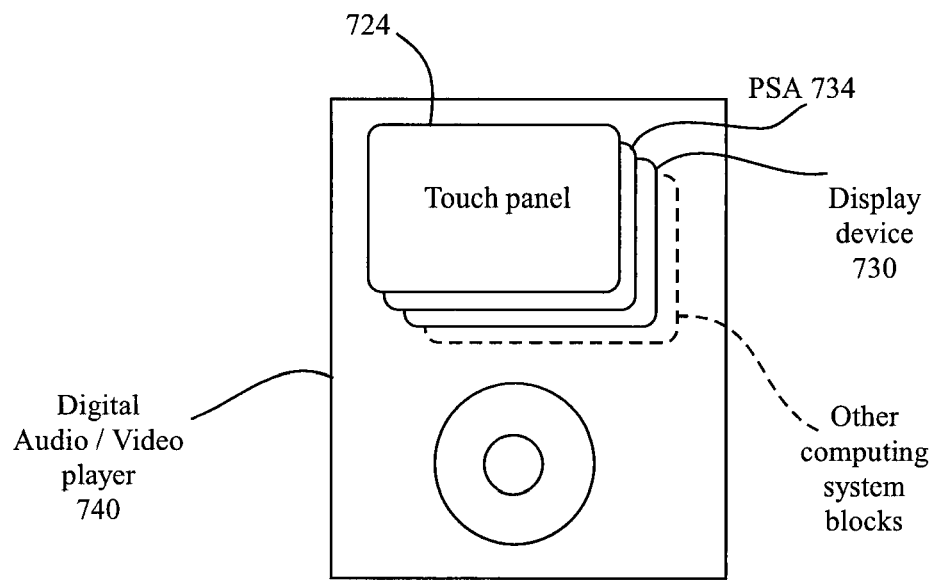
FIG. 7b illustrates an exemplary digital audio/video player that can include a touch sensor panel and computing system according to one embodiment of this invention.

FIG. 7a illustrates exemplary mobile telephone 736 that can include touch sensor panel 724 and display device 730 stackups (optionally bonded together using PSA 734) and computing system described above according to embodiments of the invention. FIG. 7b illustrates exemplary digital audio/video player 740 that can include touch sensor panel 724 and display device 730 stackups (optionally bonded together using PSA 734) and computing system described above according to embodiments of the invention. The mobile telephone and digital audio/video player of FIGS. 7a and 7b can advantageously benefit from the touch sensor panel described above because the touch sensor panel can enable these devices to be smaller and less expensive, which are important consumer factors that can have a significant effect on consumer desirability and commercial success.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A touch sensor panel, comprising:
   a plurality of patterns of conductive material disposed along a first direction, formed on a single layer and supported on one side of a substrate; and
   a plurality of distinct patches of the conductive material supported on the same side of the substrate as the plurality of patterns of conductive material, the plurality of distinct patches disposed in substantially the same single layer, and plural groups of the plurality of distinct patches disposed along a second direction, different from the first direction, the distinct patches in a particular group connected together via at least one of a plurality of conductor traces;
   wherein at least sections of the plurality of distinct patches are separate from, non-overlapping with, and adjacent to sections of the plurality of patterns of conductive material such as to form a substantially co-planar, single layer array of mutual capacitance sensors, each mutual capacitance sensor responsive to a fringing electric field between a section of one of the plurality of distinct patches and an adjacent, non-overlapping, co-planar section of one of the plurality of patterns of conductive material; and wherein:
the plurality of patterns of conductive material disposed along the first direction is configured as one of a drive line or a sense line for the array of mutual capacitance sensors, and the plurality groups of the plurality of distinct patches disposed along the second direction is configured as the other of the drive line or the sense line for the substantially co-planar, single layer array of mutual capacitance sensors; and
in operation, the drive lines driven with one or more stimulation signals to establish the fringing electric field for coupling charge onto the sense lines.

2. The touch sensor panel of claim 1, wherein the plurality of patterns of conductive material are formed with notches and staggered edges to form the sections.

3. The touch sensor panel of claim 1, wherein the plurality of conductor traces are disposed at least in a border area of the touch sensor panel, the plurality of patterns of conductive material connected to at least one of the plurality of conductor traces.

4. The touch sensor panel of claim 3, wherein the portions of the plurality of patterns of conductive material and portions of the plurality of distinct patches are formed partially over the plurality of conductor traces but separated therefrom by a dielectric material.

5. The touch sensor panel of claim 4, further comprising vias formed in the dielectric material for providing connections between the portions of the plurality of patterns of conductive material and the plurality of conductor traces and between the portions of the plurality of distinct patches and the plurality of conductor traces.

6. The touch sensor panel of claim 1, wherein the plurality of patterns of conductive material comprises Indium Tin Oxide (ITO).

7. The touch sensor panel of claim 4, wherein the plurality of conductor traces are formed from metal.

8. The touch sensor panel of claim 1, wherein the substrate is a cover material for a touch sensitive device.

9. The touch sensor panel of claim 1, further comprising a cover material for a touch sensitive device coupled to the substrate.

10. The touch sensor panel of claim 4, wherein the plurality of conductor traces are routed to a single side of the substrate for connecting to a flex circuit.

11. The touch sensor panel of claim 1, wherein each of the plurality of distinct patches and adjacent sections of the plurality of patterns of conductive material have about the same surface area.

12. The touch sensor panel of claim 1, each sensor of the mutual capacitance sensors is elongated in at least one of the first and second directions to provide spatial filtering.

13. The touch sensor panel of claim 1, the touch sensor panel integrated into a computing system.

14. The touch sensor panel of claim 13, the computing system integrated into a mobile telephone or digital media player.

15. The touch sensor panel of claim 1, wherein the plurality of conductor traces comprises metal traces which are disposed on a border area of the touch sensor panel; and
wherein the sections of the plurality of distinct patches which are separate from, non-overlapping with, and adjacent to the plurality of patterns of conductive material are connected to the metal traces by single layer transparent conductive traces disposed substantially along the first direction.

16. A method for forming a touch sensor panel, comprising:
forming a plurality of column-like patterns of conductive material disposed in a first direction on a single layer on one side of a substrate;
forming a plurality of distinct patches of the conductive material on the same side of the substrate as the plurality of column-like patterns of conductive material and disposed in substantially the same single layer as the plurality of column-like patterns,
arranging the plurality of distinct patches into in a plurality of rows;
providing a plurality of conductor traces;
connecting distinct patches in a particular row together via at least one of the plurality of conductor traces;
forming a substantially co-planar, single layer array of mutual capacitance sensors from at least sections of the plurality of distinct patches together with sections of the plurality of column-like patterns of conductive material, the at least sections of the plurality of distinct patches being separate from, non-overlapping with, and adjacent to the sections of the plurality of column-like patterns of conductive material; and
configuring drive lines from one of the plurality of column-like patters or the plurality of distinct patches and configuring sense lines from the other of the plurality of column-like patters or the plurality of distinct patches.

17. The method of claim 16, further comprising forming the column-like patterns of conductive material with notches and staggered edge.

18. The method of claim 16, further comprising forming the plurality of conductor traces in a border area of the substrate for providing a connection to each distinct patch in a particular row and for providing a connection to each column-like pattern of conductive material.

19. The method of claim 18, further comprising forming the plurality of column-like patterns of conductive material and the plurality of distinct patches partially over the plurality of conductor traces but separated therefrom by a dielectric material.

20. The method of claim 19, further comprising forming vias in the dielectric material for providing the connections between the column-like patterns of conductive material and the plurality of conductor traces and the plurality of distinct patches and the plurality of conductor traces.

21. The method of claim 16, wherein the conductive material is Indium Tin Oxide (ITO).

22. The method of claim 18, further comprising forming the plurality of conductor traces from metal.

23. The method of claim 16, wherein the substrate is a cover material for a touch sensitive device.

24. The method of claim 16, further comprising attaching a cover material for a touch sensitive device to the substrate.

25. The method of claim 18, further comprising routing the plurality of conductor traces to a single side of the substrate for connecting to a flex circuit.

26. The method of claim 17, further comprising forming each distinct patch and adjacent sections of the column-like patterns to have substantially the same surface area.

27. The method of claim 16, further comprising elongating each sensor to create spatial blurring.

28. A mobile telephone including a touch sensor panel, the touch sensor panel comprising:
a plurality of patterns of conductive material disposed along a first direction, formed on a single layer and supported on one side of a substrate; and a plurality of distinct patches of the conductive material supported on the same side of the substrate as the plurality of patterns of conductive material, the plurality of distinct patches disposed in substantially the same single layer, and plural groups of the plurality of distinct patches disposed along a second direction, different from the first direction, the distinct patches in a particular group connected together via at least one of a plurality of conductor traces;

wherein at least sections of the plurality of distinct patches are separate from, non-overlapping with, and adjacent to sections of the patterns of conductive material such as to form a substantially co-planar, single layer array of mutual capacitance sensors; and wherein the plurality of patterns of conductive material disposed along the first direction is configured as one of a drive line or a sense line for the array of mutual capacitance sensors, and the plurality groups of the plurality of distinct patches disposed along the second direction is configured as the other of the drive line or the sense line for the array of mutual capacitance sensors.

29. A digital media player including a touch sensor panel, the touch sensor panel comprising:

a plurality of patterns of conductive material disposed along a first direction, formed on a single layer and supported on one side of a substrate; and a plurality of distinct patches of the conductive material supported on the same side of the substrate as the plurality of patterns of conductive material, the plurality of distinct patches disposed in substantially the same single layer, and plural groups of the plurality of distinct patches disposed along a second direction, different from the first direction, the distinct patches in a particular group connected together via at least one of a plurality of conductor traces;

wherein at least sections of the plurality of distinct patches are separate from, non-overlapping with, and adjacent to sections of the plurality of patterns of conductive material such as to form a substantially co-planar, single layer array of mutual capacitance sensors; and wherein the plurality of patterns of conductive material disposed along the first direction is configured as one of a drive line or a sense line for the array of mutual capacitance sensors, and the plurality groups of the plurality of distinct patches disposed along the second direction is configured as the other of the drive line or the sense line for the array of mutual capacitance sensors.

30. The touch sensor panel of claim 1, wherein the plurality of distinct patches and the plurality of patterns of conductive material are disposed in a non-interleaved relationship with respect to one another.

31. The touch sensor panel of claim 1, wherein each of the plurality of patterns of conductive material extends across substantially the entirety of the touch sensor panel along the first direction without interleaving with any of the plurality of distinct patches such that a gap is disposed substantially along the first direction separating each of the plurality of patterns of conductive material from the plurality of distinct patches.

32. The touch sensor panel of claim 1, wherein ones of the plurality of patterns of conductive material are connected only along one end thereof to at least one of the plurality of conductive traces, and alternate adjacent ones of the plurality of patterns of conductive patterns of conductive material are connected only along the other end thereof to at least one of the plurality of conductive traces, wherein the plurality of conductor traces are disposed in a border area of the touch sensor panel, the plurality of patterns of conductive material connected to at least one of the plurality of conductor traces.

33. A touch sensor panel, comprising:

a plurality of columns of a conductive material formed on a single layer and supported on one side of a substrate;

a plurality of patches of the conductive material supported on the same side of the substrate as the plurality of columns, the plurality of patches formed on the same layer as the plurality of columns adjacent to the plurality of columns and arranged in a plurality of rows, each patch in a particular row connected together in a border area of the touch sensor panel but isolated from each other in a central area of the touch sensor panel;

one of the plurality of columns of conductive material and the plurality of rows configured as drive lines and the other of the plurality of columns of conductive material and the plurality of rows configured as sense line; and wherein:

portions of the plurality of patches and portions of the plurality of columns configured as a co-planar, single layer, array of mutual capacitance sensors, each mutual capacitance sensor responsive to a fringing electric field between the portion of one of the plurality of patches and an adjacent, non-overlapping, co-planar portion of one of the plurality of patterns of conductive material; and the drive lines driven with one or more stimulation signals thereby establishing the fringing electric fields for coupling charge onto the sense lines.

34. A touch sensor panel, comprising:

a plurality of columns of a conductive material formed on a single layer and supported on one side of a substrate;

a plurality of distinct patches of the conductive material supported on the same side of the substrate as the plurality of columns, the plurality of distinct patches formed on the same layer as the plurality of columns adjacent to the plurality of columns and arranged in a plurality of rows;

one of the plurality of columns of conductive material and the plurality of rows configured as drive lines and the other of the plurality of columns of conductive material and the plurality of rows configured as sense line; and wherein:

portions of the plurality of distinct patches and portions of the plurality of columns configured as a co-planar, single layer, array of mutual capacitance sensors, each mutual capacitance sensor responsive to a fringing electric field between the portion of one of the plurality of distinct patches and an adjacent, non-overlapping, co-planar portion of one of the plurality of patterns of conductive material; and the drive lines configured to be driven with one or more stimulation signals thereby establishing the fringing electric fields for coupling to the sense lines.

* * * * *

UNITED STATES PATENT AND TRADEMARK OFFICE
CERTIFICATE OF CORRECTION

| | | |
|---|---|---|
| PATENT NO. | : 8,633,915 B2 | Page 1 of 1 |
| APPLICATION NO. | : 12/038760 | |
| DATED | : January 21, 2014 | |
| INVENTOR(S) | : Steve Porter Hotelling et al. | |

It is certified that error appears in the above-identified patent and that said Letters Patent is hereby corrected as shown below:

<u>In the Claims</u>:

At column 1, claim number 10, line 45, delete "conductive" and insert
-- conductor --

At column 2, claim number 16, lines 26 and 28, delete "patters" and insert
-- patterns --

At column 1, claim number 32, lines 2 and 5, delete "conductive" and insert
-- conductor --

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,633,915 B2 | Page 1 of 1 |
| APPLICATION NO. | : 12/038760 | |
| DATED | : January 21, 2014 | |
| INVENTOR(S) | : Steve Porter Hotelling et al. | |

It is certified that error appears in the above-identified patent and that said Letters Patent is hereby corrected as shown below:

In the Claims:

At column 9, claim number 10, line 45, delete "conductive" and insert
-- conductor --

At column 10, claim number 16, lines 26 and 28, delete "patters" and insert
-- patterns --

At column 12, claim number 32, lines 2 and 5, delete "conductive" and insert
-- conductor --

This certificate supersedes the Certificate of Correction issued April 29, 2014.

Signed and Sealed this
Twentieth Day of May, 2014

Michelle K. Lee
*Deputy Director of the United States Patent and Trademark Office*